United States Patent
Ji

(10) Patent No.: US 9,860,428 B1
(45) Date of Patent: Jan. 2, 2018

(54) SIGNAL CORRECTION METHOD AND APPARATUS, AND TERMINAL

(71) Applicant: HUAWEI TECHNOLOGIES CO., LTD., Shenzhen, Guangdong (CN)

(72) Inventor: Yuan Ji, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/637,375

(22) Filed: Jun. 29, 2017

(30) Foreign Application Priority Data

Jun. 30, 2016 (CN) .......................... 2016 1 0506387

(51) Int. Cl.
| | |
|---|---|
| H04N 5/21 | (2006.01) |
| H04N 5/208 | (2006.01) |
| G06T 5/00 | (2006.01) |
| H04N 1/409 | (2006.01) |
| H04N 5/14 | (2006.01) |

(52) U.S. Cl.
CPC ............ *H04N 5/208* (2013.01); *G06T 5/002* (2013.01); *G06T 5/003* (2013.01); *G06T 5/005* (2013.01); *H04N 1/4092* (2013.01); *H04N 5/14* (2013.01)

(58) Field of Classification Search
CPC ............ H04N 5/208; H04N 5/21; H04N 5/14; H04N 5/142; H04N 1/4092; H04N 9/646; G06T 5/002; G06T 5/003; G06T 5/005
USPC ............... 348/625, 630, 607, 624, 252, 253; 382/254, 263, 264, 266, 274, 275
See application file for complete search history.

(56) References Cited

U.S. PATENT DOCUMENTS

| | | | |
|---|---|---|---|
| 5,745,188 A * | 4/1998 | Antonov .................. | H04N 5/21 348/607 |
| 2005/0123214 A1* | 6/2005 | Takahira ................. | G06T 5/004 382/266 |
| 2005/0270425 A1 | 12/2005 | Min | |
| 2006/0017773 A1 | 1/2006 | Sheraizin et al. | |
| 2010/0189373 A1 | 7/2010 | Ayzenberg | |

OTHER PUBLICATIONS

Extended European Search Report, dated Oct. 24, 2017, in European Application No. 17178946.4 (14 pp.).

* cited by examiner

*Primary Examiner* — Sherrie Hsia
(74) *Attorney, Agent, or Firm* — Staas & Halsey LLP

(57) ABSTRACT

The present invention discloses a signal correction method and apparatus, and a terminal, and relates to the signal processing field. The method includes: receiving an input signal, where the input signal is an audio signal or an image signal, the input signal includes signals that are corresponding to multiple units respectively, and any one of the units is a sampling point of the audio signal or a pixel unit of the image signal; performing texture detection on a target unit to obtain a first signal; extracting a high frequency component of a signal of the target unit to obtain a second signal; performing multiplication processing and non-linear processing on the first signal and the second signal to obtain a sharpness correction signal of the target unit; and performing sharpness correction on the signal of the target unit according to the sharpness correction signal.

26 Claims, 7 Drawing Sheets

SIGNAL CORRECTION METHOD AND APPARATUS, AND TERMINAL

CROSS-REFERENCE TO RELATED APPLICATION

This application claims priority to Chinese Patent Application No. 201610506387.7, filed on Jun. 30, 2016, which is hereby incorporated by reference in its entirety.

TECHNICAL FIELD

The present invention relates to the signal processing field, and in particular, to a signal correction method and apparatus, and a terminal.

BACKGROUND

A definition enhancement technology can improve signal detail, and has been widely applied to the signal processing field currently. However, when a prior-art definition enhancement method is used to process a signal, an overshoot phenomenon is likely to occur, reducing signal quality. As shown in FIG. 1, 101 represents a waveform of an original signal, 102 represents a signal waveform obtained after definition enhancement processing has been performed on the original signal, and the signal waveform obtained after the processing includes an upward protrusion 103 and a downward protrusion 104, that is, an overshoot phenomenon occurs.

To suppress an overshoot phenomenon, an image quality improvement device is proposed in the prior art. Referring to FIG. 2, the image quality improvement device includes a first differentiating circuit 201, a second differentiating circuit 202, a multiplier 203, an adder 204, and a minimum/maximum filter 205. After an original signal is input to the first differentiating circuit 201 and the second differentiating circuit 202, the first differentiating circuit 201 generates a first derivative signal of the original signal, the second differentiating circuit 202 generates a second derivative signal of the original signal, the multiplier 203 multiplies the first derivative signal by the second derivative signal to generate a sharpness correction signal, the adder 204 adds the original signal and the sharpness correction signal to generate a signal on which definition enhancement processing has been performed, and the minimum/maximum filter 205 detects and filters the signal on which definition enhancement processing has been performed to control an overshoot amplitude of a corrected signal.

The prior art has the following disadvantages:

When a signal is processed by using the foregoing image quality improvement device, processing effects on signals of different amplitudes are different, resulting in an unnatural processed image. That is, a small-amplitude signal has a smaller definition enhancement extent compared with a large-amplitude signal, or a large-amplitude signal has a larger definition enhancement extent compared with a small-amplitude signal. In addition, the foregoing processing method for controlling an overshoot amplitude of an output signal also results in an unnatural processed image.

SUMMARY

To resolve the prior-art problem, embodiments of the present invention provide a signal correction method and apparatus, and a terminal. The technical solutions are as follows:

According to a first aspect, a signal correction method is provided, where the method includes:

receiving an input signal, where the input signal is an audio signal or an image signal, the input signal includes signals that are corresponding to multiple units respectively, and any one of the units is a sampling point of the audio signal or a pixel unit of the image signal;

performing texture detection on a target unit in the input signal according to a signal of at least one unit within a neighborhood in which the target unit is located, to obtain a first signal, where the first signal indicates texture features of the target unit and the neighborhood;

extracting a high frequency component of a signal of the target unit according to the signal of the at least one unit within the neighborhood to obtain a second signal;

performing multiplication processing and non-linear processing on the first signal and the second signal to obtain a sharpness correction signal of the target unit, where an amplitude of the sharpness correction signal has a linear relationship with an amplitude of the signal of the target unit; and performing sharpness correction on the signal of the target unit according to the sharpness correction signal.

The signal of the target unit may be a signal of an audio sampling point or a luminance signal of the pixel unit. The neighborhood may be determined according to a location and a preset size of the target unit.

With reference to the first aspect, in a first possible implementation of the first aspect, the performing texture detection on a target unit in the input signal according to a signal of at least one unit within a neighborhood in which the target unit is located, to obtain a first signal includes:

calculating an absolute difference between signals of any two neighboring units within the neighborhood, where the absolute difference between the signals of the any two neighboring units is an absolute value of a difference between the signals of the any two neighboring units; and performing combination processing on multiple absolute differences calculated within the neighborhood to obtain the first signal, where the first signal represents values of the multiple absolute differences.

With reference to the first possible implementation of the first aspect, in a second possible implementation of the first aspect, the performing combination processing on multiple absolute differences calculated within the neighborhood, to obtain the first signal includes:

calculating N absolute differences within the neighborhood, and performing calculation on any two neighboring absolute differences of the N absolute differences according to a location sequence of two units corresponding to each absolute difference, to obtain N−1 fourth signals, where the fourth signal represents values of two corresponding absolute differences; and obtaining a minimum value of the N−1 fourth signals as the first signal.

With reference to the second possible implementation of the first aspect, in a third possible implementation of the first aspect, the performing combination processing on multiple absolute differences calculated within the neighborhood, to obtain the first signal includes:

calculating N absolute differences within the neighborhood, and performing calculation on any two neighboring absolute differences of the N absolute differences according to a location sequence of two units corresponding to each absolute difference, to obtain N−1 fourth signals, where the fourth signal represents values of two corresponding absolute differences;

obtaining a minimum value of the N−1 fourth signals as a fifth signal;

performing weighted mixing on the N−1 fourth signals to obtain a sixth signal; and performing weighted mixing on the fifth signal and the sixth signal to obtain the first signal.

With reference to the second or the third possible implementation of the first aspect, in a fourth possible implementation of the first aspect, the performing calculation on any two neighboring absolute differences of the N absolute differences according to a location sequence of two units corresponding to each absolute difference, to obtain N−1 fourth signals includes:

obtaining a maximum value of the any two neighboring absolute differences of the N absolute differences to obtain the N−1 fourth signals; or calculating a sum of the any two neighboring absolute differences of the N absolute differences to obtain the N−1 fourth signals; or calculating a quadratic sum of the any two neighboring absolute differences of the N absolute differences, and calculating a square root of each quadratic sum to obtain the N=1 fourth signals.

With reference to any one of the foregoing implementations of the first aspect, in a fifth possible implementation of the first aspect, N is an even number; and when weighted mixing is performed on the N−1 fourth signals to obtain the sixth signal, a weight of the $$\left(\frac{N}{2}+x\right)^{th}$$

fourth signal is equal to a weight of the $$\left(\frac{N}{2}-x\right)^{th}$$

fourth signal, where $$0 < x < \frac{N}{2} - 1,$$

and x is an integer.

With reference to the first aspect, in a sixth possible implementation of the first aspect, the performing multiplication processing and non-linear processing on the first signal and the second signal to obtain a sharpness correction signal of the target unit includes:

performing multiplication processing on the first signal and the second signal to obtain a third signal, where an amplitude of the third signal has a non-linear relationship with the amplitude of the signal of the target unit;

querying, according to a preset non-linear correspondence, for a sharpness correction signal corresponding to the third signal, where the preset non-linear correspondence includes a non-linear correspondence between a signal and a sharpness correction signal.

With reference to the first aspect, in a seventh possible implementation of the first aspect, the performing multiplication processing and non-linear processing on the first signal and the second signal to obtain a sharpness correction signal of the target unit includes:

performing multiplication processing and non-linear processing on the first signal and the second signal by using the following formulas, to obtain the sharpness correction signal:

$$L = T_2^a * T_1^b;$$

$$V_1 = L_1^{\frac{1}{a+b}}; \text{ and}$$

$$V_2 = -(-L_2)^{\frac{1}{a+b}},$$

where $T_1$ represents the first signal, $T_2$ represents the second signal, and a and b are rational numbers not less than 0; $L_1$ represents a signal component not less than 0 in a signal L, and $V_1$ represents a sharpness correction signal corresponding to $L_1$; and $L_2$ represents a signal component less than 0 in the signal L, and $V_2$ represents a sharpness correction signal corresponding to $L_2$.

With reference to the first aspect, in an eighth possible implementation of the first aspect, the performing multiplication processing and non-linear processing on the first signal and the second signal to obtain a sharpness correction signal of the target unit includes:

performing multiplication processing and non-linear processing on the first signal and the second signal by using the following formulas, to obtain the sharpness correction signal:

$$V_1 = (T_2^a * T_1^b)^{\frac{1}{a+b}}; \text{ and}$$

$$V_2 = -((-T_2)^a * T_1^b)^{\frac{1}{a+b}},$$

where $T_1$ represents the first signal, $T_2$ represents the second signal, a and b are rational numbers not less than 0, $V_1$ represents a sharpness correction signal corresponding to a signal component not less than 0 in the signal $T_2$, and $V_2$ represents a sharpness correction signal corresponding to a signal component less than 0 in the signal $T_2$.

With reference to the first aspect, in a ninth possible implementation of the first aspect, the performing sharpness correction on the signal of the target unit according to the sharpness correction signal includes:

calculating a sum of the signal of the target unit and the sharpness correction signal; or adjusting the amplitude of the sharpness correction signal, and calculating a sum of the adjusted sharpness correction signal and the signal of the target unit, where an adjusted amplitude of the sharpness correction signal is determined according to an amplitude of the signal of the at least one unit within the neighborhood.

With reference to the first aspect, in a tenth possible implementation of the first aspect, the neighborhood includes neighborhoods of the target unit in multiple dimensions, the sharpness correction signal of the target unit includes sharpness correction signals of the target unit in the multiple dimensions, and the dimensions include a horizontal dimension, a vertical dimension, a diagonal dimension from upper left to lower right, a diagonal dimension from upper right to lower left, and a time dimension; and after the sharpness correction signal of the target unit is obtained, the method further includes:

determining a sum of the sharpness correction signals in the multiple dimensions as the sharpness correction signal of the target unit.

With reference to the first aspect, in an eleventh possible implementation of the first aspect, the neighborhood includes neighborhoods of the target unit in multiple dimensions, the first signal and the second signal include first signals and second signals of the target unit in the multiple dimensions, and the dimensions include a horizontal dimension, a vertical dimension, a diagonal dimension from upper left to lower right, a diagonal dimension from upper right to lower left, and a time dimension; and the performing multiplication processing and non-linear processing on the first signal and the second signal to obtain a sharpness correction signal of the target unit includes:

performing multiplication processing on the first signals and the second signals of the target unit in the multiple dimensions to obtain third signals in the multiple dimensions;

performing weighted mixing on the third signals in the multiple dimensions to obtain a multi-dimensional mixed signal; and performing non-linear processing on the multi-dimensional mixed signal to obtain the sharpness correction signal of the target unit.

With reference to the first aspect, in a twelfth possible implementation of the first aspect, the neighborhood is a neighborhood of the target unit in a first dimension, where the first dimension is any one of a horizontal dimension, a vertical dimension, a diagonal dimension, or a time dimension; and after the performing sharpness correction on the signal of the target unit according to the sharpness correction signal, the method further includes:

using a signal obtained after sharpness correction is performed in the first dimension as an input signal in a second dimension, where the second dimension is a dimension, other than the first dimension, of the horizontal dimension, the vertical dimension, the diagonal dimension, or the time dimension;

performing, according to a signal of at least one unit within a neighborhood that is in the second dimension and that is of the target unit in the input signal in the second dimension, texture detection on the target unit to obtain a seventh signal, where the seventh signal indicates texture features of the target unit and the neighborhood of the target unit in the second dimension;

extracting, according to the signal of the at least one unit within the neighborhood that is in the second dimension and that is of the target unit in the input signal in the second dimension, a high frequency component of a signal of the target unit in the input signal in the second dimension to obtain an eighth signal;

performing multiplication processing and non-linear processing on the seventh signal and the eighth signal to obtain a sharpness correction signal of the target unit in the second dimension, where an amplitude of the sharpness correction signal of the target unit in the second dimension has a linear relationship with an amplitude of the signal of the target unit in the input signal in the second dimension; and performing, according to the sharpness correction signal of the target unit in the second dimension, sharpness correction on the signal of the target unit in the input signal in the second dimension.

According to a second aspect, a signal correction apparatus is provided, where the apparatus includes an input circuit, a texture detector, a high frequency extractor, an fusion circuit, and a first adder, and the apparatus is configured to perform the signal correction method according to the first aspect.

According to a third aspect, a terminal is provided, where the terminal includes: an I/O (Input/Output, input/output) device and a processor, and the terminal is configured to perform the signal correction method according to the first aspect.

The technical solutions provided in the embodiments of the present invention bring the following beneficial effects:

According to the method, the apparatus, and the terminal provided in the embodiments of the present invention, after texture detection and high frequency component extraction are performed on a target unit, multiplication processing and non-linear processing are performed on an obtained first signal and an obtained second signal to obtain a sharpness correction signal. The non-linear processing enables a linear relationship between an amplitude of the sharpness correction signal and an amplitude of a signal of the target unit. This can ensure a balanced processing effect on signals of different amplitudes, and avoid a problem of an unnatural corrected signal due to different processing effects on the signals of different amplitudes. Moreover, a used texture detection manner can suppress an overshoot phenomenon.

Further, in texture detection processing, textures of the target unit and at least one unit within a neighborhood in which the target unit is located are included. This can ensure a small amplitude of the sharpness correction signal and suppress an overshoot phenomenon if the target unit is in a flat area or at an edge of a flat area. In addition, an overshoot strength and width can be controlled by statically or dynamically adjusting, in a texture detection process, a weight used for weighted mixing.

Further, in multi-dimensional processing, the embodiments of the present invention provide a solution of performing weighted mixing on signals in multiple dimensions and then performing non-linear processing, so as to reduce processing costs.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
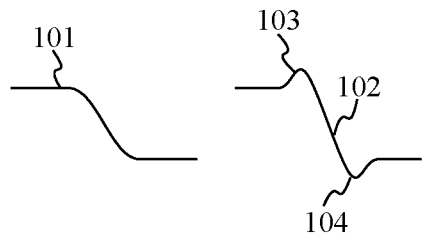
FIG. 1 is a schematic diagram of an overshoot phenomenon in the prior art.
Figure 2:
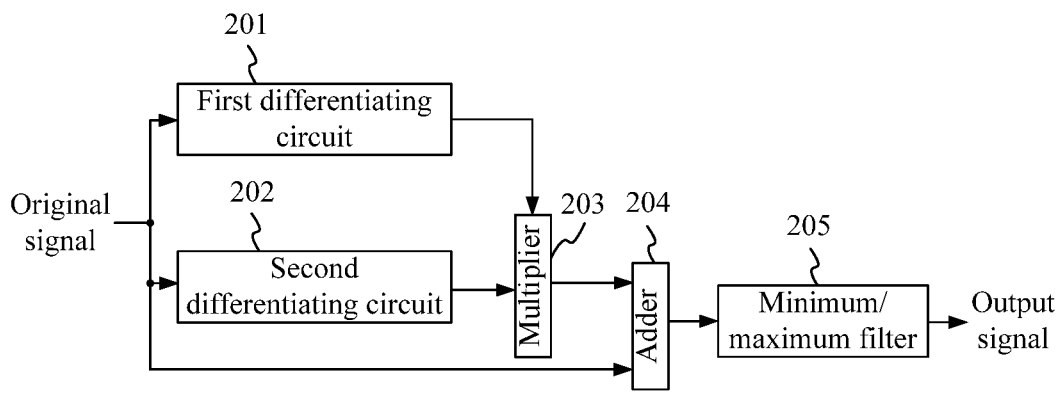
FIG. 2 is a structural schematic diagram of an image quality improvement device provided in the part art.
Figure 3:
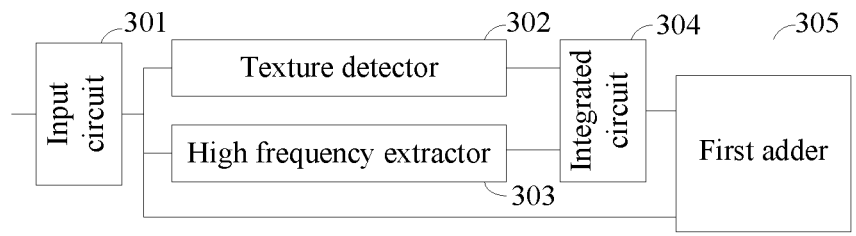
FIG. 3 is a schematic structural diagram of a signal correction apparatus according to an embodiment of the present invention.

FIG. 3 is a schematic structural diagram of a signal correction apparatus according to an embodiment of the present invention. Referring to FIG. 3, the apparatus includes an input circuit 301, a texture detector 302, a high frequency extractor 303, an fusion circuit 304, and a first adder 305.

The input circuit 301 is configured to receive an input signal, where the input signal is an audio signal or an image signal, the input signal includes signals that are corresponding to multiple units respectively, and any one of the units is a sampling point of the audio signal or a pixel unit of the image signal.

The texture detector 302 is configured to perform texture detection on a target unit in the input signal according to a signal of at least one unit within a neighborhood in which the target unit is located, to obtain a first signal.

The high frequency extractor 303 is configured to extract a high frequency component of a signal of the target unit according to the signal of the at least one unit within the neighborhood to obtain a second signal.

The fusion circuit 304 is configured to perform multiplication processing and non-linear processing on the first signal obtained by the texture detector 302 and the second signal obtained by the high frequency extractor 303, to obtain a sharpness correction signal.

The first adder 305 is configured to perform sharpness correction on the signal of the target unit according to the sharpness correction signal.

A person skilled in the art should know that, the input circuit 301, the texture detector 302, the high frequency extractor 303, the fusion circuit 304, the first adder 305, and the like may be digital circuits including some basic logical devices. For details, reference may be made to the prior art.

Because amplitudes of the first signal and the second signal each have a linear relationship with an amplitude of the signal of the target unit, after multiplication processing is performed, an amplitude of a signal has a non-linear relationship with the amplitude of the signal of the target unit. Therefore, performing multiplication processing and non-linear processing on the first signal and the second signal can ensure that an amplitude of the obtained sharpness correction signal has a linear relationship with the amplitude of the signal of the target unit and that a balanced processing effect can be achieved on signals of different amplitudes.

In actual application, for the five devices included in the signal correction apparatus, after obtaining an output signal, each device can dynamically adjust an amplitude of the output signal. An adjusted amplitude may be predetermined, or determined according to an amplitude of the output signal. This is not limited in this embodiment of the present invention.

According to the apparatus provided in this embodiment of the present invention, after texture detection and high frequency component extraction are performed on a target unit, multiplication processing and non-linear processing are performed on an obtained first signal and an obtained second signal to obtain a sharpness correction signal, so that an amplitude of the sharpness correction signal has a linear relationship with an amplitude of a signal of the target unit. This can ensure a balanced processing effect on signals of different amplitudes, and avoid a problem that a signal on which sharpness correctness has been performed is unnatural due to different processing effects on the signals of different amplitudes. Moreover, a used texture detection manner can suppress an overshoot phenomenon.

Optionally, the texture detector 302 includes a difference calculation circuit and a combination processing circuit.

The difference calculation circuit is configured to calculate an absolute difference between signals of any two neighboring units within the neighborhood, where the absolute difference between the signals of the any two neighboring units is an absolute value of a difference between the signals of the any two neighboring units.

The combination processing circuit is configured to perform combination processing on multiple absolute differences calculated within the neighborhood, to obtain the first signal, where the first signal represents values of the multiple absolute differences.

Optionally, the combination processing circuit is configured to: calculate N absolute differences within the neighborhood, and perform calculation on any two neighboring absolute differences of the N absolute differences according to a location sequence of two units corresponding to each absolute difference, to obtain N−1 fourth signals, where the fourth signal represents values of two corresponding absolute differences; and obtain a minimum value of the N=1 fourth signals as the first signal.

Optionally, the combination processing circuit is configured to: calculate N absolute differences within the neighborhood, and perform calculation on any two neighboring absolute differences of the N absolute differences according to a location sequence of two units corresponding to each absolute difference, to obtain N−1 fourth signals, where the fourth signal represents values of two corresponding absolute differences; obtain a minimum value of the N−1 fourth signals as a fifth signal; perform weighted mixing on the N−1 fourth signals to obtain a sixth signal; and perform weighted mixing on the fifth signal and the sixth signal to obtain the first signal.

Optionally, the combination processing circuit is configured to: obtain a maximum value of any two neighboring absolute differences of the N absolute differences to obtain N−1 fourth signals; or calculate a sum of any two neighboring absolute differences of the N absolute differences to obtain N−1 fourth signals; or calculate a quadratic sum of any two neighboring absolute differences of the N absolute differences, and calculate a square root of each quadratic sum to obtain N−1 fourth signals.

Optionally, N is an even number. When weighted mixing is performed on the N−1 fourth signals to obtain the sixth signal, a weight of the $$\left(\frac{N}{2}+x\right)^{th}$$

fourth signal is equal to a weight of the $$\left(\frac{N}{2}-x\right)^{th}$$

fourth signal, where $$0<x<\frac{N}{2}-1,$$

and x is an integer.

Optionally, the fusion circuit 304 includes a multiplier and a non-linear processor.

The multiplier is configured to perform multiplication processing on the first signal and the second signal to obtain a third signal, where an amplitude of the third signal has a non-linear relationship with the amplitude of the signal of the target unit.

The non-linear processor is configured to query, according to a preset non-linear correspondence, for a sharpness correction signal corresponding to the third signal, where the preset non-linear correspondence includes a non-linear correspondence between a signal and a sharpness correction signal.

Optionally, the fusion circuit 304 is configured to perform multiplication processing and non-linear processing on the first signal and the second signal by using the following formulas, to obtain the sharpness correction signal:

$$L = T_2^a * T_1^b;$$

$$V_1 = L_1^{\frac{1}{a+b}}; \text{ and}$$

$$V_2 = -(-L_2)^{\frac{1}{a+b}},$$

where $T_1$ represents the first signal, $T_2$ represents the second signal, and a and b are rational numbers not less than 0; $L_1$ represents a signal component not less than 0 in a signal L, and $V_1$ represents a sharpness correction signal corresponding to $L_1$; and $L_2$ represents a signal component less than 0 in the signal L, and $V_2$ represents a sharpness correction signal corresponding to $L_2$.

Optionally, the fusion circuit 304 is configured to perform multiplication processing and non-linear processing on the first signal and the second signal by using the following formulas, to obtain the sharpness correction signal:

$$V_1 = (T_2^a * T_1^b)^{\frac{1}{a+b}}; \text{ and}$$

$$V_2 = -((-T_2)^a * T_1^b)^{\frac{1}{a+b}},$$

where $T_1$ represents the first signal, $T_2$ represents the second signal, a and b are rational numbers not less than 0, $V_1$ represents a sharpness correction signal corresponding to a signal component not less than 0 in the signal $T_2$, and $V_2$ represents a sharpness correction signal corresponding to a signal component less than 0 in the signal $T_2$.

Optionally, the first adder 305 is configured to calculate a sum of the signal of the target unit and the sharpness correction signal.

The first adder 305 is configured to: adjust an amplitude of the sharpness correction signal, and calculate a sum of the adjusted sharpness correction signal and the signal of the target unit, where an adjusted amplitude of the sharpness correction signal is determined according to an amplitude of the signal of the at least one unit within the neighborhood.

Optionally, the neighborhood includes neighborhoods of the target unit in multiple dimensions, the sharpness correction signal of the target unit includes sharpness correction signals of the target unit in the multiple dimensions, and the dimensions include a horizontal dimension, a vertical dimension, a diagonal dimension from upper left to lower right, a diagonal dimension from upper right to lower left, and a time dimension. The apparatus further includes a second adder.

The second adder is configured to determine a sum of the sharpness correction signals in the multiple dimensions as the sharpness correction signal of the target unit.

Optionally, the neighborhood includes neighborhoods of the target unit in multiple dimensions, the first signal and the second signal include first signals and second signals of the target unit in the multiple dimensions, and the dimensions include a horizontal dimension, a vertical dimension, a diagonal dimension from upper left to lower right, a diagonal dimension from upper right to lower left, and a time dimension.

The fusion circuit 304 is configured to: perform multiplication processing on the first signals and the second signals of the target unit in the multiple dimensions to obtain third signals in the multiple dimensions; perform weighted mixing on the third signals in the multiple dimensions to obtain a multi-dimensional mixed signal; and perform non-linear processing on the multi-dimensional mixed signal to obtain the sharpness correction signal of the target unit.

Optionally, the neighborhood is a neighborhood of the target unit in a first dimension, where the first dimension is any one of a horizontal dimension, a vertical dimension, a diagonal dimension, or a time dimension. The apparatus further includes a trigger circuit.

The trigger circuit is configured to: use a signal obtained by the first adder after sharpness correction is performed in the first dimension as an input signal in a second dimension, and trigger the texture detector 302 and the high frequency extractor 303, where the second dimension is a dimension, other than the first dimension, of the horizontal dimension, the vertical dimension, the diagonal dimension, or the time dimension.

The texture detector 302 is further configured to: perform, according to a signal of at least one unit within a neighborhood that is in the second dimension and that is of the target unit in the input signal in the second dimension, texture detection on the target unit to obtain a seventh signal, where the seventh signal indicates texture features of the target unit and the neighborhood of the target unit in the second dimension.

The high frequency extractor 303 is further configured to extract, according to the signal of the at least one unit within the neighborhood that is in the second dimension and that is of the target unit in the input signal in the second dimension, a high frequency component of a signal of the target unit in the input signal in the second dimension to obtain an eighth signal.

The fusion circuit 304 is further configured to perform multiplication processing and non-linear processing on the seventh signal and the eighth signal to obtain a sharpness correction signal of the target unit in the second dimension, where an amplitude of the sharpness correction signal of the target unit in the second dimension has a linear relationship with an amplitude of the signal of the target unit in the input signal in the second dimension.

The first adder 305 is further configured to perform, according to the sharpness correction signal of the target unit in the second dimension, sharpness correction on the signal of the target unit in the input signal in the second dimension.

All of the foregoing optional technical solutions may form an optional embodiment of the present invention by means of combination. Details are not further described herein.

Figure 4:
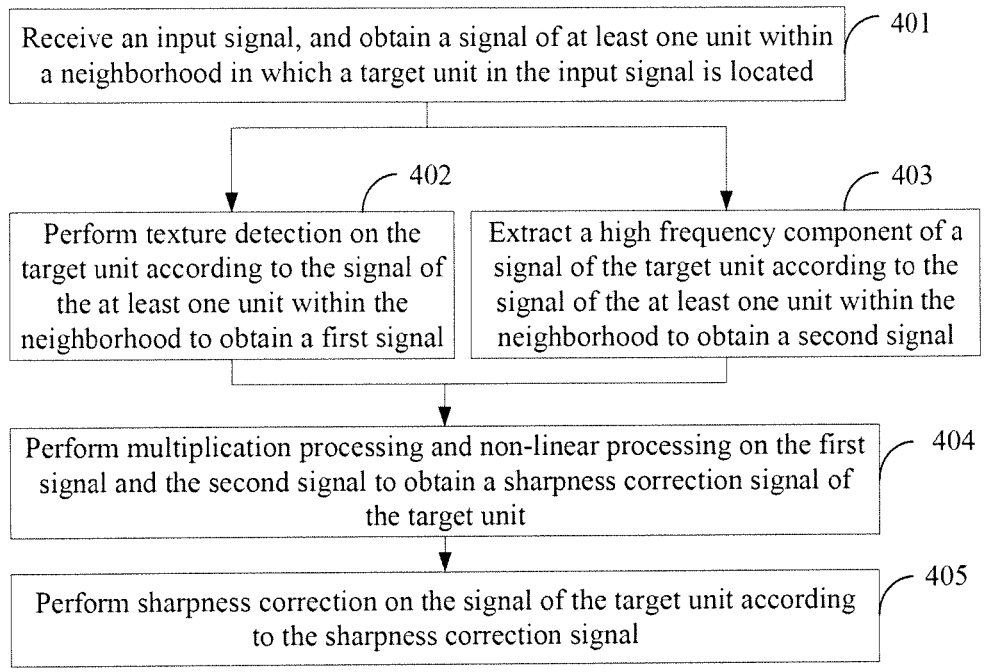
FIG. 4 is a flowchart of a signal correction method according to an embodiment of the present invention.

FIG. 4 is a flowchart of a signal correction method according to an embodiment of the present invention. This embodiment of the present invention is performed by a signal correction apparatus. Referring to FIG. 4, the method includes the following steps.

401. Receive an input signal, and obtain a signal of at least one unit within a neighborhood in which a target unit in the input signal is located.

In this embodiment of the present invention, the signal correction apparatus is configured to perform sharpness correction on the signal, and may be an apparatus having a signal processing capability, for example, a computer, a server, a mobile phone, a tablet computer, a camera, a television set, and a chip. A type of the signal correction apparatus is not limited in this embodiment of the present invention.

A to-be-corrected input signal may include an audio signal, an image signal, and the like. Correspondingly, the input signal includes signals corresponding to multiple units. When the input signal is an audio signal, any one of the units in the input signal may be a sampling point of the audio signal. Alternatively, when the input signal is an image signal, any one of the units in the input signal may be a pixel unit of the image signal. This is not limited in this embodiment of the present invention.

An example in which sharpness correction is performed on a signal of the target unit in the input signal is used in this embodiment of the present invention. When the input signal is an audio signal, the target unit is a sampling point of the audio signal, and the signal of the target unit is a signal of the sampling point. Alternatively, when the input signal is an image signal, the target unit is a pixel unit of the image signal, and the signal of the target unit is a luminance signal of the pixel unit. In addition, a process of performing sharpness correction on a signal of each unit is similar to the foregoing process. Details are not further described in this embodiment of the present invention.

A signal feature of the target unit is related to a signal of another unit within the neighborhood. Therefore, to facilitate sharpness correction on the signal of the target unit, the signal of the at least one unit within the neighborhood in which the target unit is located needs to be obtained.

The neighborhood is an area in which the target unit is located. The neighborhood includes the target unit, and may further include another unit near the target unit. The neighborhood in which the target unit is located may be determined according to a location and a preset size of the target unit. For different types of signals, the preset size may be correspondingly determined according to a sampling interval or according to a quantity of pixel units. For example, the preset size may be five pixel units or seven pixel units. This is not limited in this embodiment of the present invention. For example, a neighborhood of a target pixel unit may be an area with a location of the target pixel unit as a center and with a preset quantity of pixel units as a radius.

In addition, the target unit has neighborhoods in different dimensions. For example, a neighborhood may be a line segment area in a direction in one-dimensional space, and the line segment area includes the target unit and multiple units that are located on a same line segment as the target unit; or a neighborhood may be a planar area in two-dimensional space, and the planar area includes the target unit and multiple units that are located on a same plane as the target unit; or a neighborhood may be a three-dimensional area in three-dimensional space, and the three-dimensional area includes the target unit and signals, in different time dimensions, of multiple units that are located on a same line segment as the target unit. The neighborhood in which the target unit is located is not limited in this embodiment of the present invention.

Figure 5:
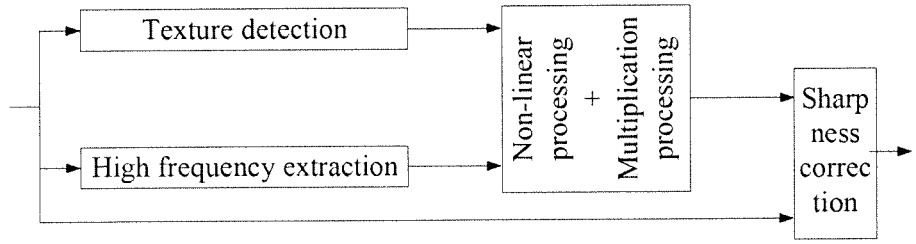
FIG. 5 is an operation flowchart of a signal correction method according to an embodiment of the present invention.
Figure 6:
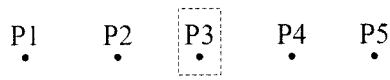
FIG. 6 is a schematic diagram of a unit within a neighborhood according to an embodiment of the present invention.

In this embodiment of the present invention, an operation procedure of the signal correction method may be shown in FIG. 5. For a specific process, refer to the following step 402 to step 406.

402. Perform texture detection on the target unit according to the signal of the at least one unit within the neighborhood to obtain a first signal.

The first signal indicates texture features of the target unit and the neighborhood in which the target unit is located, and can reflect flatness of an area in which the target unit is located or a nearby area, so as to determine whether the target unit is in a flat area or at an edge of a flat area.

Specifically, the signal correction apparatus calculates an absolute difference between signals of any two neighboring units within the neighborhood, and performs combination processing on multiple absolute differences calculated within the neighborhood, to obtain the first signal.

The absolute difference between the signals of the any two neighboring units is an absolute value of a signal difference between the any two neighboring units. Combination processing is performed after the absolute difference between the signals of the any two neighboring units is calculated, so that the first signal obtained after processing can represent values of the multiple absolute differences, thereby reflecting flatness of the area in which the target unit is located or a neighborhood.

Further, in an example in which the neighborhood includes N+1 units, the signal correction apparatus calculates N absolute differences within the neighborhood, where N is a positive integer, and N is greater than 1. Preferably, N is an even number, and the target unit is the $\left(\frac{N}{2}+1\right)^{th}$ unit within the neighborhood.

After the N absolute differences are calculated, calculation is performed on any two neighboring absolute differences of the N absolute differences according to a location sequence of two units corresponding to each absolute difference, to obtain N−1 fourth signals, where the fourth signal represents values of two corresponding absolute differences; and then a relatively small first signal is calculated according to the N−1 fourth signals.

A concept of a neighboring absolute difference is described by using a first unit, a second unit, and a third unit that are arranged sequentially as an example. A first absolute difference is calculated according to signals of the first unit and the second unit, and a second absolute difference is calculated according to signals of the second unit and the third unit. Because the first absolute difference and the second absolute difference are corresponding to a same unit, the first absolute difference and the second absolute difference may be considered to be neighboring absolute differences.

Considering that an overshoot phenomenon is likely to occur in a unit in an area in which a flat area is neighboring to an edge area, in this embodiment of the present invention, if the target unit is in the flat area or at the edge of the flat area, an absolute difference calculated according to the signal of the target unit and a signal of a unit neighboring to the target unit is small. Therefore, by calculating the relatively small first signal from the N−1 fourth signals, it can be ensured that: an amplitude of the first signal is small provided that the target unit is in the flat area or at the edge of the flat area, thereby reducing an amplitude of a subsequently obtained sharpness correction signal and suppressing the overshoot phenomenon.

For example, a to-be-corrected target unit is P3, a neighborhood in which P3 is located includes five units: P1, P2, P3, P4, and P5, and the signal correction apparatus calculates an absolute difference between signals of any two units within the neighborhood to obtain four absolute differences: G1, G2, G3, and G4:

G1=abs(P1−P2);
G2=abs(P2−P3);
G3=abs(P3−P4); and
G4=abs(P4−P5), where abs(x) refers to calculating an absolute value of x, and x is any value.

Afterwards, the signal correction apparatus performs calculation on any two neighboring absolute differences of G1, G2, G3, or G4 to obtain three fourth signals: M1, M2, and M3, and selects a relatively small signal from M1, M2, and M3 as a first signal.

Specifically, the performing calculation on any two neighboring absolute differences of the N absolute differences to obtain the N−1 fourth signals may include any one of the following step 4021 to step 4023:

4021. Obtain a maximum value of the any two neighboring absolute differences of the N absolute differences to obtain the N−1 fourth signals.

Figure 7:
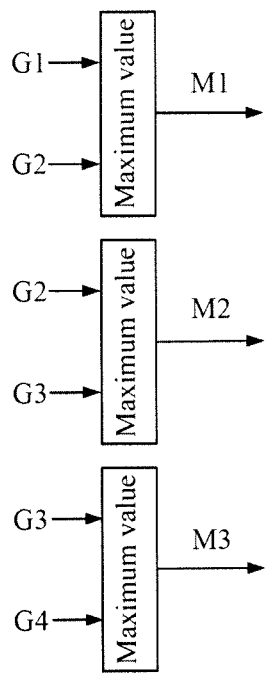
FIG. 7 is an operation flowchart of calculating a fourth signal according to an embodiment of the present invention.

Referring to FIG. 7, the signal correction apparatus calculates a maximum value of the any two neighboring absolute differences of G1, G2, G3, and G4. That is, a maximum value of G1 and G2 is used as M1, a maximum value of G2 and G3 is used as M2, and a maximum value of G3 and G4 is used as M3, so that three fourth signals are obtained.

The obtained fourth signal represents values of two corresponding absolute differences, and can describe flatness of areas in which three units included in the corresponding two absolute differences are located. For example, if P1, P2, and P3 are in a flat area, a value of M1 is small; if P1, P2, and P3 are not in a flat area, a value of M1 is relatively large. If P2, P3, and P4 are in a flat area, a value of M2 is small; if P2, P3, and P4 are not in a flat area, a value of M2 is relatively large. If P3, P4, and P5 are in a flat area, a value of M3 is small; if P3, P4, and P5 are not in a flat area, a value of M3 is relatively large.

4022. Calculate a sum of the any two neighboring absolute differences of the N absolute differences to obtain the N−1 fourth signals.

Figure 8:
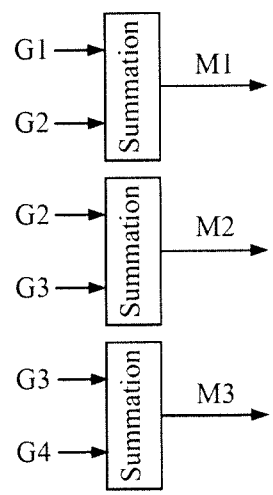
FIG. 8 is another operation flowchart of calculating a fourth signal according to an embodiment of the present invention.

Referring to FIG. 8, the signal correction apparatus calculates a sum of the any two neighboring absolute differences of G1, G2, G3, or G4. That is, a sum of G1 and G2 is used as M1, a sum value of G2 and G3 is used as M2, and a sum of G3 and G4 is used as M3, so that three fourth signals are obtained.

4023. Calculate a quadratic sum of the any two neighboring absolute differences of the N absolute differences, and calculate a square root of each quadratic sum to obtain the N−1 fourth signals.

Figure 9:
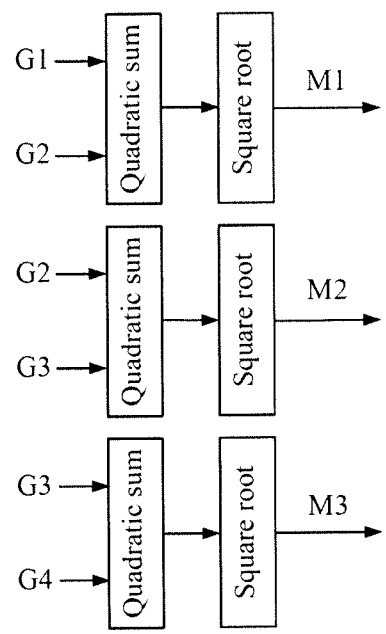
FIG. 9 is still another operation flowchart of calculating a fourth signal according to an embodiment of the present invention.

Referring to FIG. 9, the signal correction apparatus calculates a quadratic sum of the any two neighboring absolute differences of G1, G2, G3, or G4, and calculates a square root of each quadratic sum. That is, $\sqrt{G1^2+G2^2}$ is used as M1, $\sqrt{G2^2+G3^2}$ is used as M2, and $\sqrt{G3^2+G4^2}$ is used as M3, so that three fourth signals are obtained.

It should be noted that, the signal correction apparatus may obtain the fourth signals by using any one of the foregoing step 4021 to step 4023 or by using another step, provided that the obtained fourth signals have a positive correlation with the absolute differences, can represent values of the N absolute differences, and can describe flatness of an area corresponding to each fourth signal.

For example, the signal correction apparatus may first perform any one of step 4021 to step 4023 on the N absolute differences to obtain N−1 signals, perform, by using a preset texture detection algorithm, texture detection on the target unit to obtain a texture detection signal, and perform weighted mixing on the obtained N−1 signals and the obtained texture detection signal to obtain the N−1 fourth signals. The preset texture detection algorithm may be an LBP (Local Binary Pattern, local binary pattern) algorithm, a gray-level co-occurrence matrix algorithm, or another algorithm. This is not limited in this embodiment of the present invention.

Specifically, the calculating a relatively small first signal according to the N−1 fourth signals may include either of the following step 4024 and step 4025:

4024. Obtain a minimum value of the N−1 fourth signals as the first signal.

Figure 10:
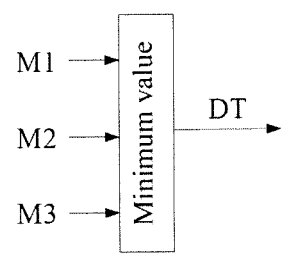
FIG. 10 is an operation flowchart of calculating a first signal according to an embodiment of the present invention.

Referring to FIG. 10, the signal correction apparatus obtains a minimum value of M1, M2, and M3 as a first signal.

4025. Obtain a minimum value of the N−1 fourth signals as a fifth signal; perform weighted mixing on the N−1 fourth signals to obtain a sixth signal; and perform weighted mixing on the fifth signal and the sixth signal to obtain the first signal.

Figure 11:
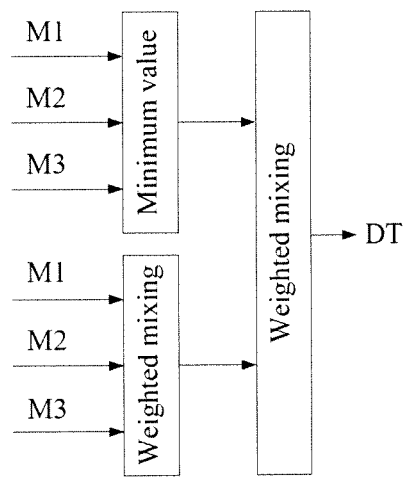
FIG. 11 is another operation flowchart of calculating a first signal according to an embodiment of the present invention.

Referring to FIG. 11, the signal correction apparatus calculates the minimum value of M1, M2, and M3, performs weighted mixing on M1, M2, and M3, and performs weighted mixing on the minimum value and a result of the weighted mixing to obtain the first signal.

When weighted mixing is performed on the N−1 fourth signals, a weight of each fourth signal may be predetermined, or detected by the signal correction apparatus and dynamically determined according to a feature of the signal of the target unit. When weighted mixing is performed on the fifth signal and the sixth signal, a weight of the fifth signal and a weight of the sixth signal may also be predetermined, or detected by the signal correction apparatus and dynamically determined according to the feature of the signal of the target unit. This is not limited in this embodiment of the present invention.

Optionally, N is an even number. When weighted mixing is performed on the N−1 fourth signals to obtain the sixth signal, a weight of the $$\left(\frac{N}{2}+x\right)^{th}$$

fourth signal is equal to a weight of the $$\left(\frac{N}{2}-x\right)^{th}$$

fourth signal, where $$0 < x < \frac{N}{2} - 1,$$

and x is an integer.

For example, when weighted mixing is performed on M1, M2, and M3, weights of M1 and M3 are equal, and a ratio of the weight of M1 or M3 to a weight of M2 may be fixed or dynamically adjusted.

It should be noted that the signal correction apparatus may obtain a texture detection result by using either of the foregoing step 4024 and step 4025 or by using another step.

For example, the signal correction apparatus may perform texture detection by using the foregoing step 4024 or step 4025 to obtain a first texture detection result, perform, by using a preset texture detection algorithm, texture detection on the target unit to obtain a second texture detection result, and perform weighted mixing on the two texture detection results to obtain the first signal. When the first signal is obtained by performing weighted mixing, a weight of the first texture detection result and a weight of the second texture detection result may also be predetermined, or detected by the signal correction apparatus and dynamically determined according to the feature of the signal of the target unit, so that an overshoot characteristic is dynamically controlled.

In addition, considering that sharpness correction is not desired for some specific textures such as intensive textures having alternating high and low changes, and that a first signal obtained from these specific textures by using the foregoing method is relatively large, a purpose of reducing a correction strength or skipping correction cannot be achieved. To avoid such a case, when obtaining the first signal, the signal correction apparatus determines whether the first signal satisfies a preset condition. The preset condition may be determined according to a texture feature of a specific texture. If the first signal satisfies the preset condition, it indicates that the target unit is of the specific texture. In this case, the signal correction apparatus may adjust an amplitude of the first signal, to reduce the amplitude of the first signal.

In addition, considering that a component with an amplitude approximating 0 in the first signal may be considered as including many noise signals, the signal correction apparatus may further attenuate or remove the component with an amplitude approximating 0 in the first signal, so as to reduce a correction strength of a small-amplitude noise signal and reduce noise of a corrected signal.

403. Extract a high frequency component of a signal of the target unit according to the signal of the at least one unit within the neighborhood to obtain a second signal.

Specifically, the signal correction apparatus may extract, according to the signal of the at least one unit within the neighborhood and by using a preset extraction algorithm or by subtracting a low frequency component from the signal of the target unit or by using another method, the high frequency component of the signal of the target unit to obtain the second signal, where the preset extraction algorithm may be a high-pass filter, a band-pass filter, a wavelet transform algorithm, and a combination of multiple algorithms. This is not limited in this embodiment of the present invention.

It should be noted that there is no absolute time sequence relationship between the foregoing step 402 and step 403, the two steps may be performed at the same time or in a specific sequence, and step 402 may be performed before step 403 or after step 403. A time sequence relationship between step 402 and step 403 is not limited in this embodiment of the present invention.

404. Perform multiplication processing and non-linear processing on the first signal and the second signal to obtain a sharpness correction signal of the target unit, so that an amplitude of the sharpness correction signal has a linear relationship with an amplitude of the signal of the target unit.

Step 404 may specifically include the following step 4041 or step 4042.

4041. Perform multiplication processing on the first signal and the second signal to obtain a third signal; and perform non-linear processing on the third signal to obtain the sharpness correction signal, so that the amplitude of the sharpness correction signal has a linear relationship with the amplitude of the signal of the target unit.

Because amplitudes of the obtained first signal and the obtained second signal have linear relationships with the amplitude of the signal of the target unit, after multiplication processing is performed, an amplitude of the obtained third signal has a non-linear relationship with the amplitude of the signal of the target unit. After non-linear processing is performed on the third signal, it can be ensured that the amplitude of the sharpness correction signal has a linear relationship with the amplitude of the signal of the target unit.

A process of performing non-linear processing on the third signal may be performed by using a preset non-linear processing algorithm, or the non-linear processing process may further include the following step 4041-*a:*

4041-*a.* Query, according to a preset non-linear correspondence, for a sharpness correction signal corresponding to the third signal.

The signal correction apparatus may predetermine the preset non-linear correspondence. The preset non-linear correspondence includes a non-linear correspondence between a signal and a sharpness correction signal. When obtaining the third signal, the signal correction apparatus queries the preset non-linear correspondence and obtains, from the preset non-linear correspondence, the sharpness correction signal corresponding to the third signal.

The preset non-linear correspondence may be determined by multiple non-linear line segments or by a non-linear curve. When the third signal is obtained, the third signal may be used as an independent variable, and the corresponding sharpness correction signal is determined by using line segments or a curve. A specific form of the preset non-linear correspondence is not limited in this embodiment of the present invention.

4042. Perform non-linear processing on the first signal and the second signal separately, and perform multiplication processing on signals obtained after non-linear processing, to obtain the sharpness correction signal.

Step 4042 differs from step 4041 in that, the signal correction apparatus first performs non-linear processing on the first signal and the second signal separately to obtain two signals, and then performs multiplication processing on the two signals to obtain the sharpness correction signal. A manner of performing non-linear processing on the first signal and the second signal may be similar to a manner of performing non-linear processing on the third signal in step 4041. Details are not further described herein.

In another embodiment, multiplication processing and non-linear processing may be further performed by using formulas. Optionally, step 404 may further include the following step 4043 or step 4044.

4043. The signal correction apparatus processes the first signal and the second signal by using the following formulas, to obtain the sharpness correction signal:

$$L = T_2^a * T_1^b;$$
$$V_1 = L_1^{\frac{1}{a+b}}; \text{ and}$$
$$V_2 = -(-L_2)^{\frac{1}{a+b}},$$

where $T_1$ represents the first signal, $T_2$ represents the second signal, and a and b are rational numbers not less than 0; $L_1$ represents a signal component not less than 0 in a signal L, and $V_1$ represents a sharpness correction signal corresponding to $L_1$; and $L_2$ represents a signal component less than 0 in the signal L, and $V_2$ represents a sharpness correction signal corresponding to $L_2$.

The following two cases may be included according to different values of a and b.

A first case is: a≥1, b≥1, and a+b≠1. In this case, $$\frac{1}{a+b} < 1.$$

Optionally, when a=1 and a=1, $L=T_1*T_2$, $V_1=L_1^{0.5}$, and $V_2=-(-L_2)^{0.5}$.

Power processing is performed on the first signal and the second signal separately by using the foregoing formula $L=T_2^a*T_1^b$, a product of powers results of the first signal and the second signal is calculated to obtain the third signal L, and then non-linear processing is performed separately on the signal component not less than 0 and the signal component less than 0 that are in the third signal L to obtain the sharpness correction signals $V_1$ and $V_2$.

That is, in the first case, multiplication processing may be first performed on the first signal and the second signal by using the foregoing formula, and then non-linear processing is performed on the obtained third signal to obtain the sharpness correction signal, implementing the solution provided in step 4041.

A second case is: a≤1, b≤1, and a+b≡1. In this case, $$\frac{1}{a+b} = 1.$$

Square root processing, that is, non-linear processing, is first performed on the first signal and the second signal by using the foregoing formula $L=T_2^a*T_1^b$. Amplitudes of the processed signals have non-linear relationships with the amplitude of the signal of the target unit. Then, multiplication processing is performed to obtain the sharpness correction signals: $V_1=L_1$, and $V_2=L_2$. Because a+b=1, it can be ensured that amplitudes of the sharpness correction signals also have linear relationships with the amplitude of the signal of the target unit.

That is, in the second case, non-linear processing may be first performed on the first signal and the second signal by using the foregoing formula, and then multiplication processing is performed to obtain the sharpness correction signal, implementing the solution provided in step 4042.

In multiple cases in which values of a and b are different, using the foregoing formulas can ensure that an amplitude of a sharpness correction signal obtained after final processing has a linear relationship with the amplitude of the signal of the target unit.

4044. The signal correction apparatus performs multiplication processing and non-linear processing on the first signal and the second signal by using the following formulas, to obtain the sharpness correction signal:

$$V_1 = (T_2^a * T_1^b)^{\frac{1}{a+b}}; \text{ and}$$
$$V_2 = -((-T_2)^a * T_1^b)^{\frac{1}{a+b}},$$

where $T_1$ represents the first signal, $T_2$ represents the second signal, a and b are rational numbers not less than 0, $V_1$ represents a sharpness correction signal corresponding to a signal component not less than 0 in the signal $T_2$, and $V_2$ represents a sharpness correction signal corresponding to a signal component less than 0 in the signal $T_2$. a and b are rational numbers not less than 0, and values of a and b may be changed according to needs. Specific values of a and b are not limited in this embodiment of the present invention.

The following two cases may be included according to different values of a and b.

A first case is: a≥1, b≥1, and a+b≠1. In this case, $$\frac{1}{a+b} < 1.$$

Optionally, when a=1 and b=1, $V_1=(T_2*T_1)^{0.5}$, and $V_2=-(-T_2*T_1)^{0.5}$.

Power processing is first performed on the first signal and the second signal separately by using the foregoing formula $T_2^a*T_1^b$ or $(-T_2)^a*T_1^b$, a product of power results of the first signal and the second signal is calculated, and then non-linear processing is performed on the obtained product to obtain the sharpness correction signals $V_1$ and $V_2$.

That is, in the first case, multiplication processing may be first performed on the first signal and the second signal by using the foregoing formula, and then non-linear processing is performed on the obtained third signal to obtain the sharpness correction signal, implementing the solution provided in step 4041.

A second case is: a≤1, b≤1, and a+b≡1. In this case, $$\frac{1}{a+b} = 1.$$

Square root processing, that is, non-linear processing, is first performed on the first signal and the second signal by using the foregoing formula $T_2{}^{a}*T_1{}^{b}$ or $(-T_2)^{a}*T_1{}^{b}$. Amplitudes of the processed signals have linear relationships with the amplitude of the signal of the target unit. Then, multiplication processing is performed to obtain the sharpness correction signal. Because a+b≡1, it can be ensured that the amplitude of the sharpness correction signal also has a linear relationship with the amplitude of the signal of the target unit.

That is, in the second case, non-linear processing may be first performed on the first signal and the second signal by using the foregoing formula, and then multiplication processing is performed to obtain the sharpness correction signal, implementing the solution provided in step 4042.

In multiple cases in which values of a and b are different, using the foregoing formulas can ensure that an amplitude of a sharpness correction signal obtained after final processing has a linear relationship with an amplitude of an original signal.

In the related art, a product of a first signal and a second signal is directly used as a sharpness correction signal, to perform sharpness correction on a target unit. However, an amplitude of the sharpness correction signal has no linear relationship with an amplitude of a signal of the target unit, and this correction method results in different processing effects on signals of different amplitudes, that is, a processing effect on a small-amplitude signal is weak, or a processing effect on a large-amplitude signal is excessively strong. Therefore, in this embodiment of the present invention, a product of the first signal and the second signal is not directly used as the sharpness correction signal, but multiplication processing and non-linear processing are performed on the first signal and the second signal, so that the amplitude of the sharpness correction signal has a linear relationship with the amplitude of the signal of the target unit, thereby ensuring a balanced processing effect on signals of different amplitudes.

In this embodiment of the present invention, considering that an overshoot phenomenon is likely to occur in a unit in an area in which a flat area is neighboring to a texture edge area, when performing texture detection, the signal correction apparatus further performs texture detection on a unit within the neighborhood in which the target unit is located, and selects a relatively small texture detection result as a texture detection result of the target unit to obtain the first signal. Even if the unit is in the texture edge area, a sharpness correction signal of a relatively small amplitude may be obtained when the first signal and the second signal are processed, so that the overshoot phenomenon can be suppressed when sharpness correction is performed.

In addition, when weighted mixing processing is performed during texture detection processing, different suppression effects on the overshoot phenomenon, including remaining some overshoot phenomena, may be obtained by adjusting weights of signals during weighted mixing. Moreover, an overshoot strength and an overshoot width can be statically or dynamically adjusted.

In another embodiment, after multiplication processing and non-linear processing are performed on the first signal and the second signal, the signal correction apparatus may further locally or globally adjust a signal obtained after processing, to further improve signal performance. Specifically, at least one of the following step 4045 or step 4046 may be included:

4045. A component with an amplitude approximating 0 in a signal may be considered as including many noise signals, and the signal correction apparatus may perform extra attenuation or removing on the component with the amplitude approximating 0 in the signal, so as to reduce an amplitude increase in a noise signal.

4046. Considering that an overshoot phenomenon is likely to occur when sharpness correction is performed on a component with a relatively large amplitude in the signal, or it is deemed that an amplitude of a signal component is large and that no strong correction is needed, the signal correction apparatus may add a processing step of adjusting a component with an amplitude greater than a preset amplitude in the signal, to reduce the amplitude of the component. The preset amplitude may be predetermined by the signal correction apparatus, or dynamically determined according to amplitudes of components in the signal. This is not limited in this embodiment of the present invention.

In another embodiment, at least one of step 4045 or step 4046 may be further performed in a process in which multiplication processing and non-linear processing are performed on the first signal and the second signal. For example, after multiplication processing is first performed on the first signal and the second signal to obtain the third signal, at least one of step 4045 or step 4046 is performed on the third signal, and then non-linear processing is performed.

It should be noted that, when the signal correction apparatus has determined a non-linear processing manner, if in addition to performing non-linear processing, processing is performed by using step 4045 or step 4046, an amplitude of a sharpness correction signal obtained after processing and the amplitude of the signal of the target unit may not satisfy a strict linear relationship. However, performance of the sharpness correction signal may be improved by performing step 4045 or step 4046, and it can be ensured, by performing non-linear processing, that the amplitude of the sharpness correction signal and the amplitude of the signal of the target unit tend to have a linear relationship. Therefore, even if the amplitude of the sharpness correction signal and the amplitude of the signal of the target unit cannot satisfy a strict linear relationship, compared with a prior-art correction method, according to this embodiment of the present invention, processing effects on signals of different amplitudes can still be balanced, to avoid a problem of an unnatural processed signal.

405. Perform sharpness correction on the signal of the target unit according to the sharpness correction signal.

Specifically, after the sharpness correction signal is obtained, the signal correction apparatus may calculate a sum of the signal of the target unit and the sharpness correction signal. Alternatively, the signal correction apparatus may adjust the amplitude of the sharpness correction signal, and calculate a sum of the adjusted sharpness correction signal and the signal of the target unit. An adjusted amplitude of the sharpness correction signal may be determined only according to the amplitude of the signal of the target unit, or according to amplitudes of signals of units within the neighborhood. This is not limited in this embodiment of the present invention.

In actual application, after sharpness correction is performed, an output signal may be output to a display and displayed by the display, or an output signal may be output to an encoder and encoded by the encoder, and an encoded signal may be transmitted to another device. Certainly, the output signal may be output to another device for processing. A processing manner of the output signal is not limited in this embodiment of the present invention.

According to the method provided in this embodiment of the present invention, after texture detection is performed on a target unit to obtain a first signal; a high frequency component of a signal of the target unit is extracted to obtain a second signal; multiplication processing and non-linear processing are performed on the first signal and the second signal to obtain a sharpness correction signal, where an amplitude of the sharpness correction signal has a linear relationship with an amplitude of the signal of the target unit; and sharpness correction is performed on the target unit according to the sharpness correction signal. This can ensure a balanced processing effect on signals of different amplitudes, and avoid a problem of an unnatural signal due to different processing effects on the signals of different amplitudes. Further, in a texture detection process, texture detection is performed on the target unit and a neighborhood of the target unit. This can ensure a small amplitude of the sharpness correction signal and suppress an overshoot phenomenon if the target unit is in a flat area or at an edge of a flat area. In addition, an overshoot strength and width is controlled by statically or dynamically adjusting, in the texture detection process, a weight used for weighted mixing.

In the foregoing embodiment, a dimension of the neighborhood is not involved, and only a neighborhood in a horizontal dimension is used as an example for description. In practice, for the target unit, the target unit has neighborhoods in multiple dimensions. The multiple dimensions may include a horizontal dimension, a vertical dimension, a diagonal dimension from upper left to lower right, a diagonal dimension from upper right to lower left, and a time dimension; and certainly, may further include another dimension. This is not limited in this embodiment of the present invention.

The signal correction apparatus may introduce units in dimensions of the target unit, determine a total neighborhood according to neighborhoods of the target unit in the multiple dimensions, and perform step 401 to step 405 according to a signal of a unit within the determined total neighborhood. For example, the signal correction apparatus may determine a neighborhood by using a sobel (sobel) operator or another matrix operator.

Figure 12:
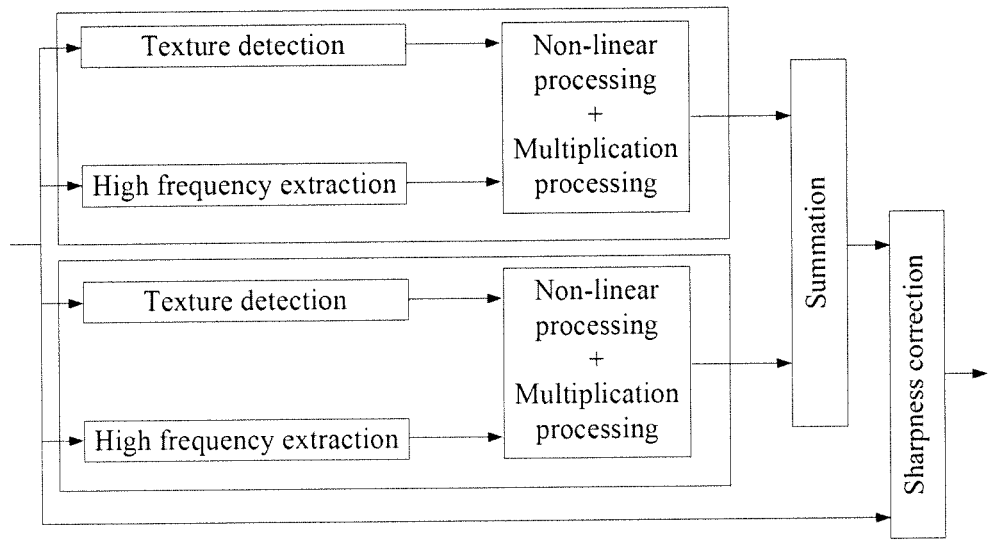
FIG. 12 is an operation flowchart of multi-dimensional correction according to an embodiment of the present invention.

Alternatively, the signal correction apparatus may process neighborhoods of the target unit in the multiple dimensions separately. In this case, a process of performing step 401 to step 405 may include the following several possible implementations:

In a first possible implementation, step 401 to step 404 are performed according to a signal of at least one unit within a neighborhood of the target unit in each dimension to obtain sharpness correction signals in multiple dimensions; a sum of the sharpness correction signals in the multiple dimensions is determined as the sharpness correction signal of the target unit; and step 405 is performed to perform sharpness correction on the signal of the target unit according to the determined sharpness correction signal. Using two dimensions as an example, FIG. 12 provides a schematic operation flowchart of a correction method.

Figure 13:
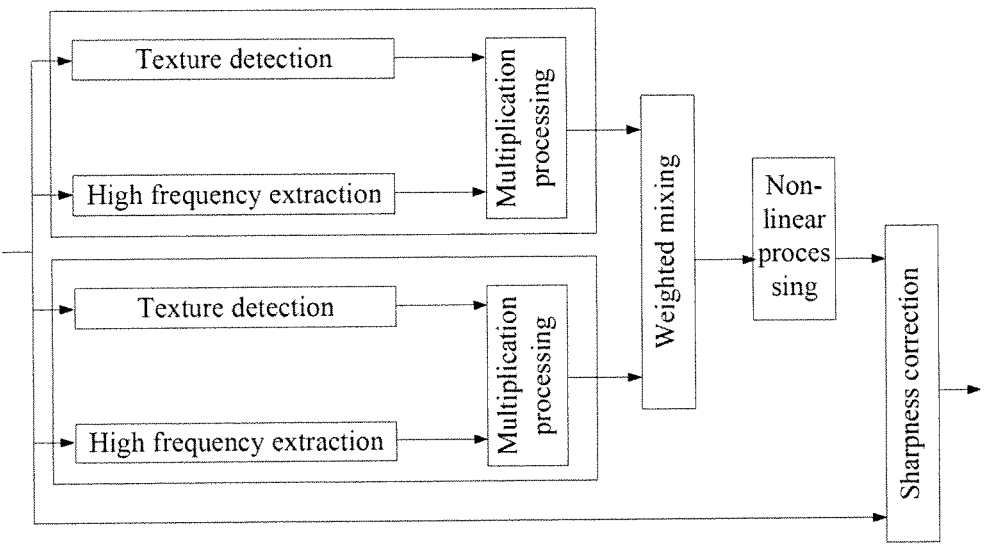
FIG. 13 is another operation flowchart of multi-dimensional correction according to an embodiment of the present invention.

In a second possible implementation, step 401 to step 403 are performed according to a signal of at least one unit within a neighborhood of the target unit in each dimension to obtain first signals and second signals in multiple dimensions; multiplication processing is performed on the first signals and the second signals of the target unit in the multiple dimensions to obtain third signals in the multiple dimensions; weighted mixing is performed on the third signals in the multiple dimensions to obtain a multi-dimensional mixed signal; step 404 is performed to perform non-linear processing on the multi-dimensional mixed signal to obtain the sharpness correction signal of the target unit; and step 405 is performed to perform sharpness correction on the signal of the target unit according to the sharpness correction signal. Using two dimensions as an example, FIG. 13 provides a schematic operation flowchart of a correction method.

In a third possible implementation, step 401 to step 405 are performed according to a signal of at least one unit within a neighborhood of the target unit in a first dimension, and a signal obtained after sharpness correction in the first dimension is used as an input signal in a second dimension.

The first dimension is any one of the horizontal dimension, the vertical dimension, the diagonal dimension, or the time dimension, and the second dimension is a dimension, other than the first dimension, of the horizontal dimension, the vertical dimension, the diagonal dimension, or the time dimension.

Figure 14:
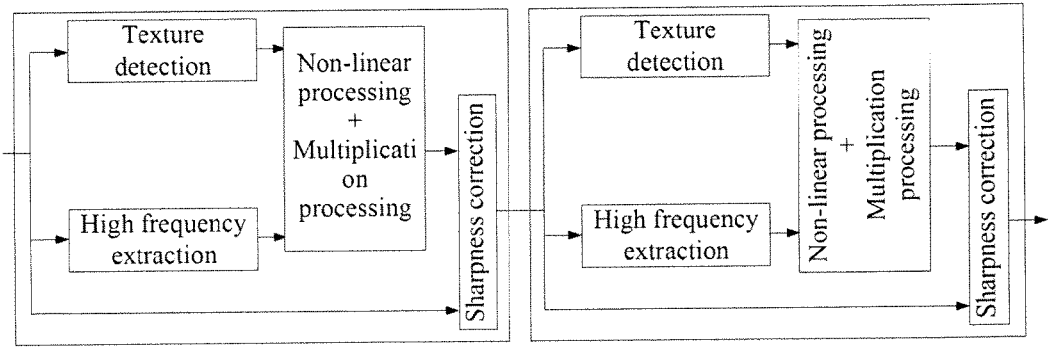
FIG. 14 is still another operation flowchart of multi-dimensional correction according to an embodiment of the present invention.

Afterwards, according to a signal of at least one unit within a neighborhood that is in the second dimension and that is of the target unit in the input signal in the second dimension, texture detection is performed on the target unit to obtain a seventh signal, where the seventh signal indicates texture features of the target unit and the neighborhood of the target unit in the second dimension; according to the signal of the at least one unit within the neighborhood that is in the second dimension and that is of the target unit in the input signal in the second dimension, a high frequency component of a signal of the target unit in the input signal in the second dimension is extracted to obtain an eighth signal; multiplication processing and non-linear processing are performed on the seventh signal and the eighth signal to obtain a sharpness correction signal of the target unit in the second dimension, where an amplitude of the sharpness correction signal of the target unit in the second dimension has a linear relationship with an amplitude of the signal of the target unit in the input signal in the second dimension; and according to the sharpness correction signal of the target unit in the second dimension, sharpness correction is performed on the signal of the target unit in the input signal in the second dimension. Using two dimensions as an example, FIG. 14 provides a schematic operation flowchart of a correction method.

That is, a signal obtained in a current dimension is used as an input signal in a next dimension in a serial fashion, and sharpness correction is performed on the input signal in the next dimension, so that an output signal is obtained after signals in the multiple dimensions are combined.

Certainly, the signal correction apparatus may use another manner to perform combination according to signals of units within the neighborhoods of the target unit in the multiple dimensions and perform sharpness correction. This is not limited in this embodiment of the present invention.

This embodiment of the present invention provides a new signal correction method, so as to control an overshoot strength, resolve a main deficiency in a common definition enhancement technology, reduce a requirement for a high frequency component of a signal, and reduce noise and interference by appropriately limiting bandwidth of an original signal.

This embodiment of the present invention may be applied to audio processing or image processing.

For an image signal, this embodiment of the present invention may be used for image collection, processing, displaying, or other processes, may be widely applied to a display device such as a television set, a display, or a mobile phone, and an image collection and processing device used for camera shooting or surveillance, and is further applicable to definition enhancement processing when image data is amplified.

For an audio signal, this embodiment of the present invention can improve a high frequency overtone of the audio signal, have a function of improving sound quality and voice intelligibility, and can be widely applied to an audio processing device such as a computer or a mobile phone.

Figure 15:
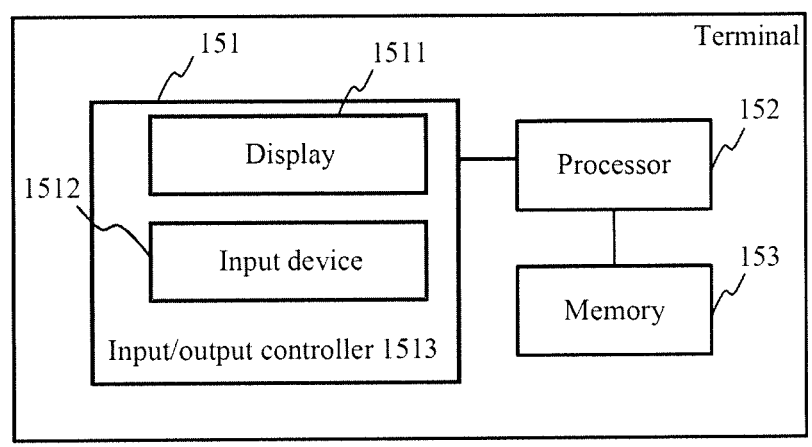
FIG. 15 is a schematic structural diagram of a terminal according to an embodiment of the present invention.

FIG. 15 is a schematic structural diagram of a terminal according to an embodiment of the present invention. Referring to FIG. 15, the terminal includes an I/O device 151 and a processor 152. The I/O device 151 is connected to the processor 152, and the I/O device is configured to receive an input signal. The input signal is an audio signal or an image signal, the input signal includes signals that are corresponding to multiple units respectively, and any one of the units is a sampling point of the audio signal or a pixel unit of the image signal. The processor 152 is configured to perform sharpness correction on a signal of a target unit in the input signal according to a signal of at least one unit within a neighborhood in which the target unit is located. For specific operations of the processor 152, refer to the foregoing method embodiment shown in FIG. 4.

Specifically, the terminal may be a mobile phone, a conventional desktop computer, a laptop notebook, or the like. The terminal includes the processor 152, and further includes the I/O device 151 that is configured to transmit information between devices inside the terminal.

For example, the I/O device 151 may include a display 1511 that is configured to display information and an input device 1512 that is configured for a user to input information, such as a mouse and a keyboard. The I/O device 151 may further include an input/output controller 1513 that is configured to receive and process inputs from multiple other devices such as a keyboard, a mouse, or an electronic stylus. Similarly, the input/output controller 1513 further provides outputs to a display, a printer, or an output device of another type. Both the display 1511 and the input device 1512 are connected to the processor 152 by using the input/output controller 1513.

Optionally, the terminal may further include a memory 153. The memory 153 is configured to store program code, and the processor 152 may invoke the program code in the memory 153 to perform a signal correction operation. Alternatively, the processor 152 may be a digital circuit that performs the foregoing method embodiment shown in FIG. 4. For a circuit structure of the processor 152, reference may be made to the foregoing signal correction apparatus embodiment shown in FIG. 3.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the principle of the present invention shall fall within the protection scope of the present invention.

What is claimed is:

1. A signal correction method, wherein the method comprises:
    receiving an input signal, wherein the input signal is an audio signal or an image signal, the input signal comprises signals that are corresponding to multiple units respectively, and any one of the units is a sampling point of the audio signal or a pixel unit of the image signal;
    performing texture detection on a target unit in the input signal according to a signal of at least one unit within a neighborhood in which the target unit is located, to obtain a first signal, wherein the first signal indicates texture features of the target unit and the neighborhood;
    extracting a high frequency component of a signal of the target unit according to the signal of the at least one unit within the neighborhood to obtain a second signal;
    performing multiplication processing and non-linear processing on the first signal and the second signal to obtain a sharpness correction signal of the target unit, wherein an amplitude of the sharpness correction signal has a linear relationship with an amplitude of the signal of the target unit; and
    performing sharpness correction on the signal of the target unit according to the sharpness correction signal.

2. The method according to claim 1, wherein the performing texture detection on a target unit in the input signal according to a signal of at least one unit within a neighborhood in which the target unit is located, to obtain a first signal comprises:
    calculating an absolute difference between signals of any two neighboring units within the neighborhood, wherein the absolute difference between the signals of the any two neighboring units is an absolute value of a difference between the signals of the any two neighboring units; and
    performing combination processing on multiple absolute differences calculated within the neighborhood, to obtain the first signal, wherein the first signal indicates values of the multiple absolute differences.

3. The method according to claim 2, wherein the performing combination processing on multiple absolute differences calculated within the neighborhood, to obtain the first signal comprises:
    calculating N absolute differences within the neighborhood, and performing calculation on any two neighboring absolute differences of the N absolute differences according to a location sequence of two units corresponding to each absolute difference, to obtain N−1 fourth signals, wherein the fourth signal indicates values of two corresponding absolute differences; and
    obtaining a minimum value of the N−1 fourth signals as the first signal.

4. The method according to claim 3, wherein the performing calculation on any two neighboring absolute differences of the N absolute differences according to a location sequence of two units corresponding to each absolute difference, to obtain N−1 fourth signals comprises:
  obtaining a maximum value of the any two neighboring absolute differences of the N absolute differences to obtain the N−1 fourth signals; or
  calculating a sum of the any two neighboring absolute differences of the N absolute differences to obtain the N−1 fourth signals; or
  calculating a quadratic sum of the any two neighboring absolute differences of the N absolute differences, and calculating a square root of each quadratic sum to obtain the N−1 fourth signals.

5. The method according to claim 2, wherein the performing combination processing on multiple absolute differences calculated within the neighborhood, to obtain the first signal comprises:
  calculating N absolute differences within the neighborhood, and performing calculation on any two neighboring absolute differences of the N absolute differences according to a location sequence of two units corresponding to each absolute difference, to obtain N−1 fourth signals, wherein the fourth signal indicates values of two corresponding absolute differences;
  obtaining a minimum value of the N−1 fourth signals as a fifth signal;
  performing weighted mixing on the N−1 fourth signals to obtain a sixth signal; and
  performing weighted mixing on the fifth signal and the sixth signal to obtain the first signal.

6. The method according to claim 5, wherein N is an even number; and when weighted mixing is performed on the N−1 fourth signals to obtain the sixth signal, a weight of the $$\left(\frac{N}{2}+x\right)^{th}$$

fourth signal is equal to a weight of the $$\left(\frac{N}{2}-x\right)^{th}$$

fourth signal, wherein $$0 < x < \frac{N}{2} - 1,$$

and x is an integer.

7. The method according to claim 1, wherein the performing multiplication processing and non-linear processing on the first signal and the second signal to obtain a sharpness correction signal of the target unit comprises:
  performing multiplication processing on the first signal and the second signal to obtain a third signal, wherein an amplitude of the third signal has a non-linear relationship with the amplitude of the signal of the target unit;
  querying, according to a preset non-linear correspondence, for a sharpness correction signal corresponding to the third signal, wherein the preset non-linear correspondence comprises a non-linear correspondence between a signal and a sharpness correction signal.

8. The method according to claim 1, wherein the performing multiplication processing and non-linear processing on the first signal and the second signal to obtain a sharpness correction signal of the target unit comprises:
  performing multiplication processing and non-linear processing on the first signal and the second signal by using the following formulas, to obtain the sharpness correction signal:

$$L = T_2^a * T_1^b;$$

$$V_1 = L_1^{\frac{1}{a+b}}; \text{ and}$$

$$V_2 = -(-L_2)^{\frac{1}{a+b}},$$

wherein
  $T_1$ indicates the first signal, $T_2$ indicates the second signal, and a and b are rational numbers not less than 0; $L_1$ indicates a signal component not less than 0 in a signal L, and $V_1$ indicates a sharpness correction signal corresponding to $L_1$; and $L_2$ indicates a signal component less than 0 in the signal L, and $V_2$ indicates a sharpness correction signal corresponding to $L_2$.

9. The method according to claim 1, wherein the performing multiplication processing and non-linear processing on the first signal and the second signal to obtain a sharpness correction signal of the target unit comprises:
  performing multiplication processing and non-linear processing on the first signal and the second signal by using the following formulas, to obtain the sharpness correction signal:

$$V_1 = (T_2^a * T_1^b)^{\frac{1}{a+b}}; \text{ and}$$

$$V_2 = -((-T_2)^a * T_1^b)^{\frac{1}{a+b}},$$

wherein
  $T_1$ indicates the first signal, $T_2$ indicates the second signal, a and b are rational numbers not less than 0, $V_1$ indicates a sharpness correction signal corresponding to a signal component not less than 0 in the signal $T_2$, and $V_2$ indicates a sharpness correction signal corresponding to a signal component less than 0 in the signal $T_2$.

10. The method according to claim 1, wherein the performing sharpness correction on the signal of the target unit according to the sharpness correction signal comprises:
  calculating a sum of the signal of the target unit and the sharpness correction signal; or
  adjusting the amplitude of the sharpness correction signal, and calculating a sum of the adjusted sharpness correction signal and the signal of the target unit, wherein an adjusted amplitude of the sharpness correction signal is determined according to an amplitude of the signal of the at least one unit within the neighborhood.

11. The method according to claim 1, wherein the neighborhood comprises neighborhoods of the target unit in multiple dimensions, the sharpness correction signal of the target unit comprises sharpness correction signals of the target unit in the multiple dimensions, and the dimensions comprise a horizontal dimension, a vertical dimension, a diagonal dimension from upper left to lower right, a diagonal dimension from upper right to lower left, and a time dimension; and after the sharpness correction signal of the target unit is obtained, the method further comprises:

determining a sum of the sharpness correction signals in the multiple dimensions as the sharpness correction signal of the target unit.

12. The method according to claim 1, wherein the neighborhood comprises neighborhoods of the target unit in multiple dimensions, the first signal and the second signal comprise first signals and second signals of the target unit in the multiple dimensions, and the dimensions comprise a horizontal dimension, a vertical dimension, a diagonal dimension from upper left to lower right, a diagonal dimension from upper right to lower left, and a time dimension; and the performing multiplication processing and non-linear processing on the first signal and the second signal to obtain a sharpness correction signal of the target unit comprises:

performing multiplication processing on the first signals and the second signals of the target unit in the multiple dimensions to obtain third signals in the multiple dimensions;

performing weighted mixing on the third signals in the multiple dimensions to obtain a multi-dimensional mixed signal; and performing non-linear processing on the multi-dimensional mixed signal to obtain the sharpness correction signal of the target unit.

13. The method according to claim 1, wherein the neighborhood is a neighborhood of the target unit in a first dimension, wherein the first dimension is any one of a horizontal dimension, a vertical dimension, a diagonal dimension, or a time dimension; and after the performing sharpness correction on the signal of the target unit according to the sharpness correction signal, the method further comprises:

using a signal obtained after sharpness correction is performed in the first dimension as an input signal in a second dimension, wherein the second dimension is a dimension, other than the first dimension, of the horizontal dimension, the vertical dimension, the diagonal dimension, or the time dimension;

performing, according to a signal of at least one unit within a neighborhood that is in the second dimension and that is of the target unit in the input signal in the second dimension, texture detection on the target unit to obtain a seventh signal, wherein the seventh signal indicates texture features of the target unit and the neighborhood of the target unit in the second dimension;

extracting, according to the signal of the at least one unit within the neighborhood that is in the second dimension and that is of the target unit in the input signal in the second dimension, a high frequency component of a signal of the target unit in the input signal in the second dimension to obtain an eighth signal;

performing multiplication processing and non-linear processing on the seventh signal and the eighth signal to obtain a sharpness correction signal of the target unit in the second dimension, wherein an amplitude of the sharpness correction signal of the target unit in the second dimension has a linear relationship with an amplitude of the signal of the target unit in the input signal in the second dimension; and performing, according to the sharpness correction signal of the target unit in the second dimension, sharpness correction on the signal of the target unit in the input signal in the second dimension.

14. A signal correction apparatus, wherein the apparatus comprises:

an input circuit, configured to receive an input signal, wherein the input signal is an audio signal or an image signal, the input signal comprises signals that are corresponding to multiple units respectively, and any one of the units is a sampling point of the audio signal or a pixel unit of the image signal;

a texture detector, configured to perform texture detection on a target unit in the input signal according to a signal of at least one unit within a neighborhood in which the target unit is located, to obtain a first signal, wherein the first signal indicates texture features of the target unit and the neighborhood;

a high frequency extractor, configured to extract a high frequency component of a signal of the target unit according to the signal of the at least one unit within the neighborhood to obtain a second signal;

an fusion circuit, configured to perform multiplication processing and non-linear processing on the first signal and the second signal, to obtain a sharpness correction signal of the target unit, wherein an amplitude of the sharpness correction signal has a linear relationship with an amplitude of the signal of the target unit; and a first adder, configured to perform sharpness correction on the signal of the target unit according to the sharpness correction signal.

15. The apparatus according to claim 14, wherein the texture detector comprises:

a difference calculation circuit, configured to calculate an absolute difference between signals of any two neighboring units within the neighborhood, wherein the absolute difference between the signals of the any two neighboring units is an absolute value of a difference between the signals of the any two neighboring units; and a combination processing circuit, configured to perform combination processing on multiple absolute differences calculated within the neighborhood, to obtain the first signal, wherein the first signal indicates values of the multiple absolute differences.

16. The apparatus according to claim 15, wherein the combination processing circuit is configured to: calculate N absolute differences within the neighborhood, and perform calculation on any two neighboring absolute differences of the N absolute differences according to a location sequence of two units corresponding to each absolute difference, to obtain N−1 fourth signals, wherein the fourth signal indicates values of two corresponding absolute differences; and obtain a minimum value of the N−1 fourth signals as the first signal.

17. The apparatus according to claim 16, wherein the combination processing circuit is configured to: obtain a maximum value of the any two neighboring absolute differences of the N absolute differences to obtain the N−1 fourth signals; or calculate a sum of the any two neighboring absolute differences of the N absolute differences to obtain the N−1 fourth signals; or calculate a quadratic sum of the any two neighboring absolute differences of the N absolute differences, and calculate a square root of each quadratic sum to obtain the N−1 fourth signals.

18. The apparatus according to claim 15, wherein the combination processing circuit is configured to: calculate N absolute differences within the neighborhood, and perform calculation on any two neighboring absolute differences of the N absolute differences according to a location sequence of two units corresponding to each absolute difference, to obtain N−1 fourth signals, wherein the fourth signal indicates values of two corresponding absolute differences; obtain a minimum value of the N−1 fourth signals as a fifth signal; perform weighted mixing on the N−1 fourth signals to obtain a sixth signal; and perform weighted mixing on the fifth signal and the sixth signal to obtain the first signal.

19. The apparatus according to claim 18, wherein N is an even number; and when weighted mixing is performed on the N−1 fourth signals to obtain the sixth signal, a weight of the $$\left(\frac{N}{2} + x\right)^{th}$$

fourth signal is equal to a weight of the $$\left(\frac{N}{2} - x\right)^{th}$$

fourth signal, wherein $$0 < x < \frac{N}{2} - 1,$$

and x is an integer.

20. The apparatus according to claim 14, wherein the fusion circuit comprises a multiplier and a non-linear processor, wherein
the multiplier is configured to perform multiplication processing on the first signal and the second signal to obtain a third signal, wherein an amplitude of the third signal has a non-linear relationship with the amplitude of the signal of the target unit; and
the non-linear processor is configured to query, according to a preset non-linear correspondence, for a sharpness correction signal corresponding to the third signal, wherein the preset non-linear correspondence comprises a non-linear correspondence between a signal and a sharpness correction signal.

21. The apparatus according to claim 14, wherein the fusion circuit is configured to perform multiplication processing and non-linear processing on the first signal and the second signal by using the following formulas, to obtain the sharpness correction signal:

$$L = T_2^a * T_1^b;$$

$$V_1 = L_1^{\frac{1}{a+b}}; \text{ and}$$

$$V_2 = -(-L_2)^{\frac{1}{a+b}},$$

wherein
$T_1$ indicates the first signal, $T_2$ indicates the second signal, and a and b are rational numbers not less than 0; $L_1$ indicates a signal component not less than 0 in a signal L, and $V_1$ indicates a sharpness correction signal corresponding to $L_1$; and $L_2$ indicates a signal component less than 0 in the signal L, and $V_2$ indicates a sharpness correction signal corresponding to $L_2$.

22. The apparatus according to claim 14, wherein the fusion circuit is configured to perform multiplication processing and non-linear processing on the first signal and the second signal by using the following formulas, to obtain the sharpness correction signal:

$$V_1 = (T_2^a * T_1^b)^{\frac{1}{a+b}}; \text{ and}$$

$$V_2 = -((-T_2)^a * T_1^b)^{\frac{1}{a+b}},$$

wherein
$T_1$ indicates the first signal, $T_2$ indicates the second signal, a and b are rational numbers not less than 0, $V_1$ indicates a sharpness correction signal corresponding to a signal component not less than 0 in the signal $T_2$ and $V_2$ indicates a sharpness correction signal corresponding to a signal component less than 0 in the signal $T_2$.

23. The apparatus according to claim 14, wherein the first adder is configured to calculate a sum of the signal of the target unit and the sharpness correction signal; or
the first adder is configured to: adjust the amplitude of the sharpness correction signal, and calculate a sum of the adjusted sharpness correction signal and the signal of the target unit, wherein an adjusted amplitude of the sharpness correction signal is determined according to an amplitude of the signal of the at least one unit within the neighborhood.

24. The apparatus according to claim 14, wherein the neighborhood comprises neighborhoods of the target unit in multiple dimensions, the sharpness correction signal of the target unit comprises sharpness correction signals of the target unit in the multiple dimensions, and the dimensions comprise a horizontal dimension, a vertical dimension, a diagonal dimension from upper left to lower right, a diagonal dimension from upper right to lower left, and a time dimension; and the apparatus further comprises:
a second adder, configured to determine a sum of the sharpness correction signals in the multiple dimensions as the sharpness correction signal of the target unit.

25. The apparatus according to claim 14, wherein the neighborhood comprises neighborhoods of the target unit in multiple dimensions, the first signal and the second signal comprise first signals and second signals of the target unit in the multiple dimensions, and the dimensions comprise a horizontal dimension, a vertical dimension, a diagonal dimension from upper left to lower right, a diagonal dimension from upper right to lower left, and a time dimension; and
the fusion circuit is configured to: perform multiplication processing on the first signals and the second signals of the target unit in the multiple dimensions to obtain third signals in the multiple dimensions; perform weighted mixing on the third signals in the multiple dimensions to obtain a multi-dimensional mixed signal; and perform non-linear processing on the multi-dimensional mixed signal to obtain the sharpness correction signal of the target unit.

26. The apparatus according to claim 14, wherein the neighborhood is a neighborhood of the target unit in a first dimension, wherein the first dimension is any one of a horizontal dimension, a vertical dimension, a diagonal dimension, or a time dimension; and the apparatus further comprises:

a trigger circuit, configured to: use a signal obtained by the first adder after sharpness correction is performed in the first dimension as an input signal in a second dimension, and trigger the texture detector and the high frequency extractor, wherein the second dimension is a dimension, other than the first dimension, of the horizontal dimension, the vertical dimension, the diagonal dimension, or the time dimension; wherein the texture detector is further configured to: perform, according to a signal of at least one unit within a neighborhood that is in the second dimension and that is of the target unit in the input signal in the second dimension, texture detection on the target unit to obtain a seventh signal, wherein the seventh signal indicates texture features of the target unit and the neighborhood of the target unit in the second dimension;

the high frequency extractor is further configured to extract, according to the signal of the at least one unit within the neighborhood that is in the second dimension and that is of the target unit in the input signal in the second dimension, a high frequency component of a signal of the target unit in the input signal in the second dimension to obtain an eighth signal;

the fusion circuit is further configured to perform multiplication processing and non-linear processing on the seventh signal and the eighth signal to obtain a sharpness correction signal of the target unit in the second dimension, wherein an amplitude of the sharpness correction signal of the target unit in the second dimension has a linear relationship with an amplitude of the signal of the target unit in the input signal in the second dimension; and the first adder is further configured to perform, according to the sharpness correction signal of the target unit in the second dimension, sharpness correction on the signal of the target unit in the input signal in the second dimension.

* * * * *